(12) United States Patent
Nagarkar et al.

(10) Patent No.: US 7,375,341 B1
(45) Date of Patent: May 20, 2008

(54) FLEXIBLE SCINTILLATOR AND RELATED METHODS

(75) Inventors: Vivek Nagarkar, Weston, MA (US); Valeriy Gaysinskiy, Allston, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 0 days.

(21) Appl. No.: 11/383,109

(22) Filed: May 12, 2006

(51) Int. Cl.
*G01T 1/20* (2006.01)

(52) U.S. Cl. .................................. 250/370.11
(58) Field of Classification Search ............ 250/370.11
See application file for complete search history.

(56) References Cited

U.S. PATENT DOCUMENTS

| | | | |
|---|---|---|---|
| 4,694,177 A * | 9/1987 | Akai ......................... | 250/368 |
| 5,117,114 A | 5/1992 | Street et al. | |
| 5,171,996 A | 12/1992 | Perez-Mendez | |
| 6,921,909 B2 | 7/2005 | Nagarkar et al. | |
| 6,998,619 B2 | 2/2006 | Karplus et al. | |
| 2002/0005489 A1* | 1/2002 | Kasuyama et al. ......... | 250/368 |
| 2005/0003295 A1* | 1/2005 | Koninckx et al. .......... | 430/139 |

OTHER PUBLICATIONS

Kelcz et al., "Conventional Chest Radiography vs Dual-Energy Computed Radiography in the Detection and Characterization of Pulmonary Nudules," *AJR Am J Roentgenol* 162:271-278 (1994).
Marshall et al., "Initial Results With Pre-Reconstruction Dual-Energy Computed Tomography (PREDECT)" *Radiology* 140:421-430 (1981).
Nagarkar et al., "CCD-Based High Resolution Digital Radiography System for Non Destructive Evaluation," *IEEE Trans. Nucl. Sci.* 44:885-889 (1997).
Nagarkar et al., "Structured CsI(T1) Scintillators for X-Ray Imaging Applications," *IEEE Trans. Nucl. Sci.* 45:492-496 (1998).
Nagarkar et al., "New Design of a Structured CsI (T1) Screen for Digital Mammography," *SPIE, Physics of Medical Imaging* 5030:541-546 (2003).
Shestakova et al., "A New Sensor for Thermal Neutro Imaging," *IEEE Trans. Nucl. Sci.* 52:1109-1113 (2005).
Steenbeek et al., "Selection of Fat-Equivalent Materials in Postprocessing Dual-Energy Quantitative CT" *Med Phys.* 19:1051-1056 (1992).
Weaver et al., "Attention Coefficients of Body Tissues Using Principal-Components Analysis" *Med Phys.* 12:40-45 (1985).

* cited by examiner

*Primary Examiner*—David Porta
*Assistant Examiner*—Mark R Gaworecki
(74) *Attorney, Agent, or Firm*—Townsend and Townsend and Crew LLP

(57) ABSTRACT

The present invention provides flexible radiation detectors and related methods, including methods of making radiation detectors and assemblies according to the present invention. A flexible radiation detector includes a first resin layer and a scintillator layer deposited on the first resin layer. A method of making a flexible radiation detector includes forming a first resin layer on a substrate, depositing a scintillator layer on the first resin layer, and removing from the substrate at least a portion of a combination comprising the first resin layer and the scintillator, thereby producing a flexible radiation detector comprising the removed portion of first resin layer and scintillator layer.

25 Claims, 8 Drawing Sheets

FLEXIBLE SCINTILLATOR AND RELATED METHODS

BACKGROUND OF THE INVENTION

The present invention relates generally to radiation detectors and methods. More specifically, the present invention relates to flexible radiation detectors, as well as radiation detection assemblies and methods including a radiation detector having multiple photodetectors optically coupled to at least two sides of the detector so as to allow improved scintillation based radiation detection.

Scintillation spectrometers are widely used in detection and spectroscopy of energetic photons and/or particles (e.g., X-rays and gamma-rays). Such detectors are commonly used, for example, in nuclear and particle physics research, medical imaging, diffraction, non destructive testing, nuclear treaty verification and safeguards, nuclear non-proliferation monitoring, and geological exploration.

A wide variety of scintillators are now available and new scintillator compositions are being developed. Among currently available scintillators, thallium-doped alkali halide scintillators have proven useful and practical in a variety of applications. One example includes thallium doped cesium iodide (CsI(Tl)), which is a highly desired material for a wide variety of medical and industrial applications due to its excellent detection properties, low cost, and easy availability. Having a high conversion efficiency, a rapid initial decay, an emission in the visible range, and cubic structure that allows fabrication into micro-columnar films (see, e.g., U.S. Pat. No. 5,171,996), CsI(Tl) has found use in radiological imaging applications. Furthermore, its high density, high atomic number, and transparency to its own light make CsI(Tl) a material of choice for X-ray and gamma-ray spectroscopy, homeland security applications, and nuclear medicine applications such as intra-operative surgical probes and Single Photon Emission Computed Tomography or SPECT.

Scintillation spectrometry generally comprises a multi-step scheme. Specifically, scintillators work by converting energetic particles such as X-rays, gamma-rays, and the like, into a more easily detectable signal (e.g., visible light). Incident energetic photons are stopped by the scintillator material of the device and, as a result, the scintillator produces light photons mostly in the visible light range that can be detected, e.g., by a suitably placed photodetector. Various possible scintillator detector configurations are known. In general, scintillator based detectors typically include a scintillator material optically coupled to a photodetector. In many instances, scintillator material is incorporated into a radiation detection device by first depositing the scintillator material on a suitable substrate. A suitable substrate can include a photodetector or a portion thereof, or a separate scintillator panel is fabricated by depositing scintillator on a passive substrate, which is then incorporated into a detection device.

Improving performance of scintillator detectors is generally of great interest, for example, in order to make scintillation based detectors more useful and capable of filling existing and emerging technical needs. One important performance consideration of particular interest in scintillator detector utilization is light output. More light leads to a higher signal-to-noise ratio (SNR) and, therefore, improved time resolution and higher energy resolution. Thus, increasing light output leads to improved detection power, performance, and overall utility of scintillators.

Generating an increase in light output is currently accomplished by increasing light output from one side of the detector. For example, when a scintillator is formed on an opaque substrate, a known way to improve light output is to deposit a reflective coating on the substrate prior to deposition of the scintillator. Although efficacious in increasing light output from the scintillator surface opposed to the substrate, the process is inefficient for several reasons. First, light needs to travel through the scintillator for an additional distance equal to the thickness of the scintillator plus a fraction (between 0 and 1) of the scintillator thickness. As a result of the increase travel distance, light is lost due, for example, to scattering and absorption in the process. Second, the reflectors themselves are inefficient and do not necessarily reflect all of the light photons in the desired direction. Photons are often reflected into another portion of the scintillator (e.g., neighboring microcolumns), are reflected to a place where they are absorbed, or can be absorbed directly by the reflector.

In addition to improved performance, there is a need for improved manufacturing methods, so as to increase the reliability of the devices and reduce production costs. One such improvement is to decrease breakage of photodetectors during assembly and manufacturing. Typically, when a photodetector is used as a substrate, it needs to be firmly held in a frame and exposed to deposition temperatures. The first coating, whether it is the scintillator material itself or another layer (e.g., resin), adheres to all exposed surfaces in the photodetector, including its delicate electrical contacts. When excess or unwanted material is trimmed or removed, these electrical contacts can be damaged, resulting in a rejected device. The same can occur during handling, e.g., for loading and unloading the photodetector on the holder for scintillator deposition, since the photodetector is easily scratched. When in the holder, which is subject to rotation during deposition, the photodetector can move within the holding frame and be scratched. Moreover, during handling, static electricity can build up and damage the electronics. Thus, such processing/fabrication steps provide an opportunity for damaging the costly photodetector, increasing the overall manufacturing time and costs.

Thus, there is a need for improved techniques and methods, as well as detection assemblies, for greater versatility as well as for improved performance, including for increasing light output of scintillation detectors.

BRIEF SUMMARY OF THE INVENTION

The present invention provides scintillation detection assemblies and related methods where light output is detected from multiple sides of a scintillation detector, thereby allowing improved performance and detection capabilities using scintillation based radiation detectors. Rather than increasing light output from only one side of the scintillator, the present invention discloses methods and assemblies that allow light to be detected from both sides of a radiation detector. Since there is no correlation between the emission of one light photon and another, the emission of scintillation photons is governed by Poisson statistics, and the information attributed to each photon is uncorrelated and independent. In the present case, averaging the information obtained from one side of the radiation detector with that from the other side will reduce uncertainties to $1/\sqrt{2}$, or approximately 30%, compared to detection utilizing only one side of a detector.

Another advantage of the present invention is that a scintillation based radiation detector can be optically coupled with one or more position-sensitive photodetectors for improved performance radiation detection and imaging assemblies. A position-sensitive photodetector is capable of determining the position on the photodetector at which an interaction with an incident light photon occurs. The determination can be made in either one dimension ("one-dimensional" photodetector, also called a linear or linear array photodetector) or two dimensions ("two-dimensional" photodetector). Two-dimensional photodetectors are capable of localizing where in a two-dimensional detection plane a light photon has interacted with the photodetector. One-dimensional photodetectors can locate a point of interaction of light along one axis, rather than two. The light detection from multiple sides of a scintillation detector together with optical coupling of one or more position-sensitive photodetectors, rather than single element detectors that are not position sensitive, allows for significantly improved performance imaging. For example, the assemblies of the present invention allow for both one-dimensional and two-dimensional imaging based on light detection from multiple sides of the radiation detector, as well as permits point source imaging in one dimension at a high count rate (large radiation flux), and performance of one-dimensional and two-dimensional distributed source imaging at high count rates (large radiation flux). As used herein, the terms "low count rate" and "low radiation flux" are generally used interchangeably and refer to a particle interaction rate in the scintillator such that the average interval between consecutive interactions in the scintillator is no larger than a fraction of the resolving time of the photodetector electronics. For instance, if the photodetector is read out at a rate of 1 sample/msec, then a count rate of 600 interactions/sec is considered a low count rate, and 2,000 interactions/sec is considered a high count rate. In medical x-ray imaging, x-ray interaction rates in the scintillator can easily exceed 1,000,000 interactions/sec, and for these applications the same photodetector with a 1 msec sampling time has to be capable of handling high count rates.

Thus, in one aspect of the present invention, a radiation detection assembly is provided. The assembly includes a radiation detector comprising a scintillator layer and an optically transparent substrate, the detector having a first side and a second side, a first imaging photodetector optically coupled to the first side of the detector, and a second imaging photodetector optically coupled to the second side of the detector, wherein at least one of the photodetectors is a position-sensitive imaging photodetector.

In another aspect, the present invention provides methods of making a radiation detector. Such a method includes depositing a scintillator layer on an optically transparent substrate so as to produce a detector having at least a first side and a second side. The method further includes optically coupling the first side of the detector to a first imaging photodetector, and optically coupling the second side of the detector to a second imaging photodetector. At least one of the photodetectors is a position-sensitive imaging photodetector.

In another aspect, a method of making a position-sensitive radiation detection device is provided. The method includes producing a flexible scintillator detector by forming a first resin coating on a substrate, depositing a scintillator layer on the first resin coating, and removing from the substrate the combination of the first resin coating and the scintillator, thereby producing a flexible scintillator comprising a first resin coating and scintillator layer. Optionally, a second resin coating can be deposited on the surfaces of the scintillator not in contact with the first resin coating, which can provide a complete cover of the scintillator. The method additionally includes optically coupling a first side of the flexible scintillator detector to a first imaging photodetector, and optically coupling a second side of the flexible scintillator detector to a second imaging photodetector, wherein at least one of the photodetectors is a position-sensitive photodetector.

A radiation detector of the invention assembly can include a variety of optically transparent substrates. In one embodiment, the substrate includes compositions such as a glass, plastic, or resin. In another embodiment, the substrate includes a fiber optic plate, prism, lens, or scintillator. The substrate can be a detector device or portion or surface thereof (e.g., optical assembly, photodetector, etc.). The substrate can be separate from a detector device and/or comprise a detector portion (e.g., scintillator panel) that can be adapted to or incorporated into a detection device or assembly.

In another embodiment of the present invention, a radiation detector of the assembly includes a resin layer or coating. A resin coating typically includes an organic polymer, for example, such as para-xylylene polymer compositions. Resin coatings can also include films, tapes, and the like and can comprise materials such as polyesters (e.g., Mylar), polyimides (e.g., Kapton™), polyvinylidene chlorides (e.g., saran resins or films), and epoxy polymers. Thus, in one embodiment, the radiation detector includes a substrate, a scintillator layer, and a resin coating disposed between the optically transparent substrate and the scintillator. For example, the radiation detector can include a resin coating or layer formed on a substrate and a scintillator layer deposited on the resin coating. In some instances, a resin coating comprises the optically transparent substrate. For example, a resin coating can be formed on a substrate and a scintillator layer then deposited on the resin coating. Following deposition of the scintillator layer on the resin, the combination of the resin coating and scintillator layer can be removed from the substrate so as to form a "flexible" scintillator detector, comprising a scintillator layer and optically transparent resin layer. Thus, in another aspect, the present invention provides a flexible radiation detector. The flexible radiation detector comprises a first resin layer and a scintillator layer deposited on the first resin layer. Without a substantially rigid component, such as the substrate on which it is initially formed, the flexible radiation detector is capable of being bent or flexed without damage (e.g., breaking apart, flaking, etc.) to the scintillator layer.

Scintillators suitable for use in the present invention include any scintillator compositions that can be suitably deposited on an optically transparent substrate of the invention as to form a scintillator layer. Scintillators can include, for example, CsI(Tl), NaI(Tl), CsI(Na), CsI(Eu), CsBr(Eu), CsI(Tl:Eu), ZnS, ZnS(Ag), ZnSe(Te), $LaBr_3$(Ce), $LaCl_3$(Ce), $LaF_3$, $LaF_3$(Ce), ceramic scintillators, and the like. In a particular embodiment, microcolumnar CsI(Tl) is used. In one embodiment, the microcolumnar CsI(Tl) is pixellated, for example, so as to further improve contrast resolution. The scintillator layer will typically have a thickness of about 10 μm to about 5 mm. In one embodiment, a microcolumnar CsI(Tl) scintillator will have a thickness of about 3 mm to about 10 mm (e.g., "thick" scintillator). In other embodiments, the scintillator is a "thin" scintillator, having a thickness of about 10 μm to about 0.5 mm.

The radiation detector of the invention assembly can additionally have one or more coatings or layers including, for example, a coating or layer formed on a surface of the scintillator layer not in contact with the optically transparent substrate, which can provide a complete cover of the scintillator. In one embodiment, an additional coating is formed on a surface of the scintillator layer not in contact with or opposite the optically transparent substrate. The additional layer or coating can include, for example, an optically transparent polymer protective layer, a moisture protective barrier, and the like. In one embodiment, a layer or coating of resin, such as an organic polymer resin (see above), is formed on a surface of the scintillator layer not in contact with the optically transparent substrate, so that the scintillator layer is essentially encapsulated by the optically transparent substrate and the resin coating. Where the optically transparent substrate is a resin and the detector further includes an additional resin coating, the resin substrate and additional resin coating can include the same organic polymer resin (e.g., para-xylylene polymer) or different resins.

As set forth above, the radiation detection assembly of the invention additionally includes optically coupled imaging photodetectors. Various photodetectors and configurations thereof are available according to the present invention and will depend, in part, on the type of detection assembly and/or the intended use of the assembly. For example, imaging photodetectors used in the invention assemblies and methods can include one-dimensional or two-dimensional detectors, or combinations thereof. In one embodiment, two-dimensional imaging photodetectors are optically coupled to both the first and second sides of the radiation detector. The duplicated information provided in such a configuration allows for improved spatial, energy and time resolution (e.g., approximately 30% improvement). In another embodiment, the first and second photodetectors are one-dimensional photodetectors. The assembly can alternatively include a combination of one-dimensional and two-dimensional detectors. For example, in one embodiment, the first photodetector is a two-dimensional photodetector and the second photodetector comprises a single element illuminated by the scintillator layer of the radiation detector. The first and second one-dimensional photodetectors can be oriented along axes not parallel to each other. For example, the first photodetector and the second photodetector can be oriented along axes substantially orthogonal to each other.

In another embodiment, the radiation detection assembly of the invention can include additional optics for receiving and transmitting light from the detector to optically coupled photodetectors. Light receiving and transmitting optics can include, for example fiber optic elements, lenses, mirrors, and the like.

In another aspect, the invention includes methods of performing radiation detection. The method includes providing a radiation detection assembly including a radiation detector comprising a scintillator layer and an optically transparent substrate, the detector having a first side and a second side. The assembly further includes a first imaging photodetector optically coupled to the first side of the detector, and a second imaging photodetector optically coupled to the second side of the detector. The methods further includes positioning a target or detection source within a field of view of the scintillator as to detect emissions from the target or source.

Emissions detected according to the invention methods can include, for example, gamma-rays, X-rays, electrons, and the like. Targets for detection can include any source of detectable signal. A target can include, e.g., any potential source of detectable emission, gamma-ray sources (e.g., uranium and the like), X-ray sources, etc.

For a fuller understanding of the nature and advantages of the present invention, reference should be made to the ensuing detailed description and accompanying drawings. Other aspects, objects and advantages of the invention will be apparent from the drawings and detailed description that follows.

DETAILED DESCRIPTION OF THE INVENTION

The present invention provides radiation detection assemblies and methods including an improved radiation detector having multiple photodetectors optically coupled to at least two sides of the detector so as to allow improved scintillation based radiation detection. The present invention obtains a nominal doubling of the light output of a scintillation detector by forming a layer of scintillator material on an optically transparent substrate and detecting the light exiting multiple sides of the scintillator. In the case of a statistics-limited process, for example, the methods and assemblies of the present invention result in an approximate 30% improvement in spatial, time, and energy resolution, compared to detection utilizing only one side of a detector.

Figure 1:
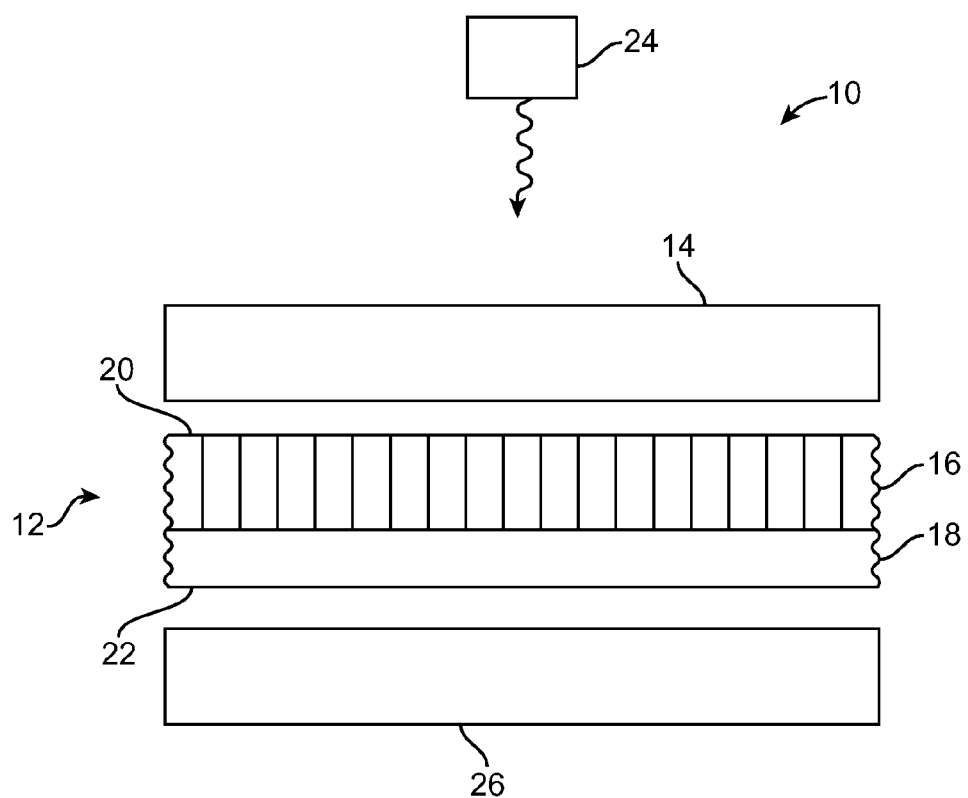
FIG. 1 illustrates a diagrammatic view of a radiation detection assembly according to an embodiment of the invention.

Referring to FIG. 1, a radiation detection assembly according to an embodiment of the present invention is described. The assembly 10 includes a radiation detector 12 and optically coupled photodetectors 14, 26. The radiation detector 12 includes a scintillator layer 16 deposited on an optically transparent substrate 18. The detector includes opposing first side 20 and second side 22. The first side 20 of the detector 12 is optically coupled to the photodetector 14. The second side 22 of the detector 12 is optically coupled to the photodetector 26.

In operation, radiation or energetic photons (e.g., X-rays, gamma-rays, etc.) emitted from a source 24 (e.g., target) incident to the detector 12 are stopped by the scintillation layer 16 and light produced by the scintillator layer 16 as a result is detected by the photodetectors 14, 26.

A radiation detector can include a variety of optically transparent substrates. As used herein, the term "optically transparent" with respect to a substrate or element of a detector refers to a substrate or element that is transparent at the wavelength of the photons emitted by the scintillator layer. A substrate can include, for example, compositions such as a glass, plastic, or resin. Additional non-limiting examples of optically transparent substrates suitable for use according to the present invention include fiber optic plates, prisms, lens, scintillators, etc. The substrate can be coupled with a detector device or portion or surface thereof (e.g., optical assembly, photodetector, etc.). The substrate can be separate from a detector device and/or comprise a detector portion (e.g., scintillator panel) that can be adapted to or incorporated into a detection device or assembly.

The substrate may be optionally processed and/or modified prior to application of the resin coating to the substrate surface. For example, a substrate surface can be processed in order to refine substrate surface conformation, such as to even the substrate surface and remove projections/recesses present on the substrate surface. In some instances, for example, substrate processing may be preformed in order to enhance adhesion of a layer deposited thereon (e.g., scintillator layer, resin, etc.). Non-limiting examples of processing include chemical etching, sandblasting, laser etching, laser patterning, cleaned (e.g., plasma cleaning procedures), and the like.

In another embodiment, a radiation detector includes a resin layer or coating. A resin coating typically includes an organic polymer, for example, such as para-xylylene polymer compositions. Resin coatings can also include films, tapes, and the like and can comprise materials such as polyesters (e.g., Mylar), polyimides (e.g., Kapton™), polyvinylidene chlorides (e.g., saran resins or films), and epoxy polymers. Thus, in one embodiment, the radiation detector includes a substrate, a scintillator layer, and a resin coating disposed between the optically transparent substrate and the scintillator. For example, the radiation detector can include a resin coating formed on a substrate and a scintillator layer deposited on the resin coating.

In some instances, the optically transparent substrate comprises a resin (e.g., organic polymer). For example, a resin coating can be formed on a substrate surface and a scintillator layer then deposited on the resin coating. Following deposition of the scintillator layer on the resin, the combination of the resin coating and scintillator layer can be removed from the substrate surface as to form a "flexible" scintillator detector, the flexible scintillator detector comprising a scintillator layer and optically transparent resin layer. The terms "flexible scintillator detector" and "flexible radiation detector" are generally used interchangeably herein.

Figure 7:
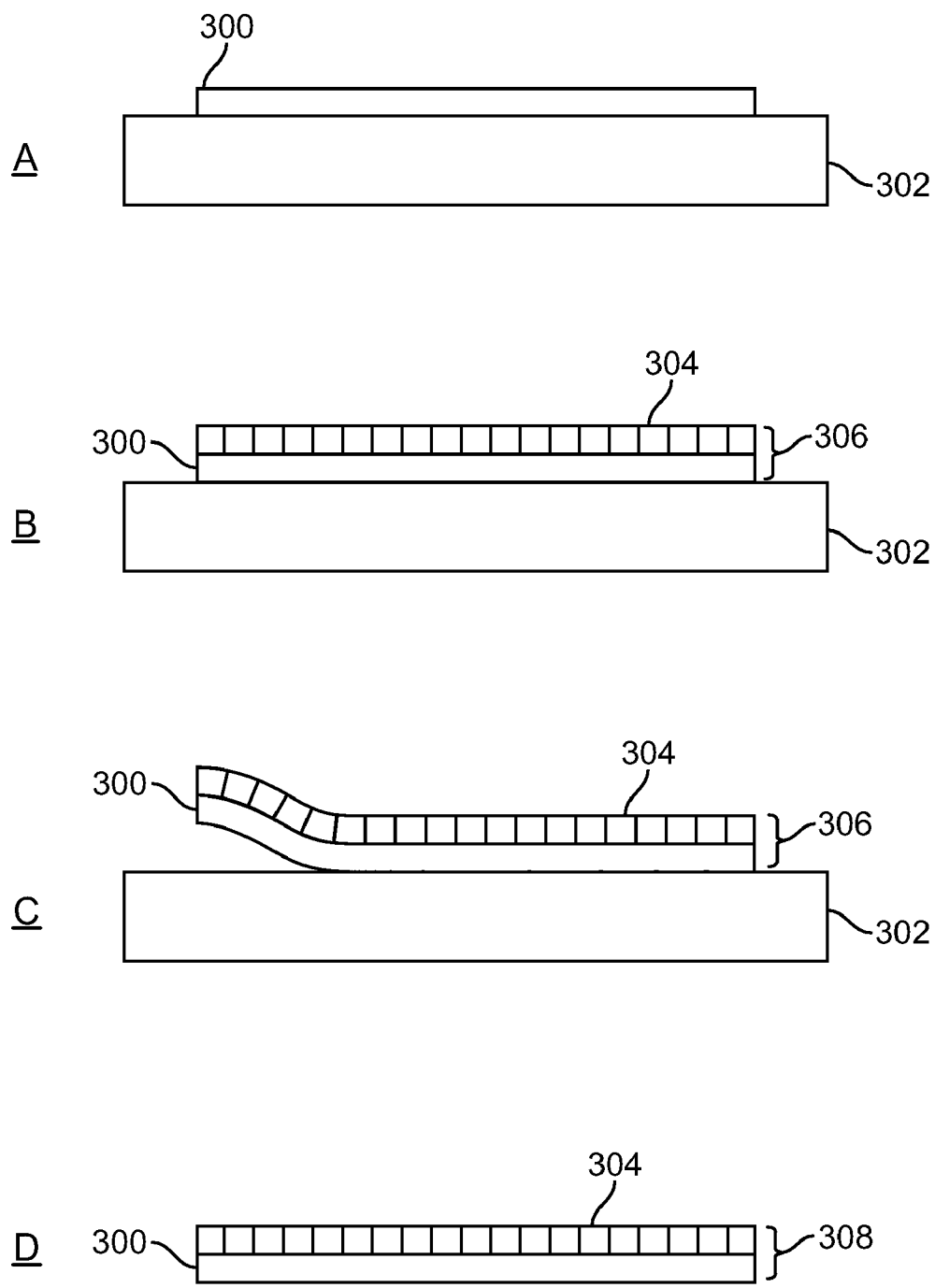
FIGS. 7A through 7D illustrate production of a flexible radiation detector.

Production of a flexible scintillator is described with respect to FIGS. 7A through 7D. Production of a flexible scintillator detector may be accomplished as follows. A layer of organic polymer resin 300, such as a para-xylylene polymer, is deposited on a substrate 302 surface having a low coefficient of friction such that the resin can be practically removed following resin deposition on the substrate (FIG. 7A). Suitable substrates can include, for example, a non-stick, polymer polytetrafluoroethylene (PTFE) or "Teflon™" coated substrate, or a processed or fine-polished substrate (e.g., fine-polished stainless steel). Once the resin coating 300 is deposited to cover the desired shape or area of the substrate 302 surface, a layer of scintillator material is deposited on the resin coating to form the scintillator layer 304 (FIG. 7B). Deposition of the scintillator layer 304 on the resin coating 300 forms a bi-layer 306 including the resin coating 300 and the scintillator 304. Masking or other deposition patterning techniques can be used to deposit the resin and/or scintillator material in the desired pattern. Additionally, patterning of the resin and/or scintillator layer can be accomplished following deposition including, for example, by selectively trimming or cutting the deposited materials.

After resin and scintillator material are deposited as described, the combination of the resin coating 300 and scintillator layer 304 can be removed from the substrate 302 surface to produce the flexible scintillator detector 308 (FIGS. 7C and 7D). For example, a flattened tool or blade (e.g., razor blade) can be used to gently lift and peel the combined resin and scintillator layer off of the substrate surface. The thickness of flexible scintillator layers produced in this manner can vary. Typically, the thickness of a scintillator layer or film of a flexible is generally in the range of about 1 to about 500 microns. Scintillator layers or films in the range of about 1 to 100 microns are very flexible and can be repeatedly bent to various angles including, for example, radii as small as 0.5 inches. Thicker scintillator layers or films (e.g., 100 microns or greater, 500 microns, etc.) can also be similarly bent, however, the number of times this can be done with a given flexible detector will depend on the thickness of the scintillator layer, and will generally decrease as the scintillator layer thickness increases.

Figure 8:
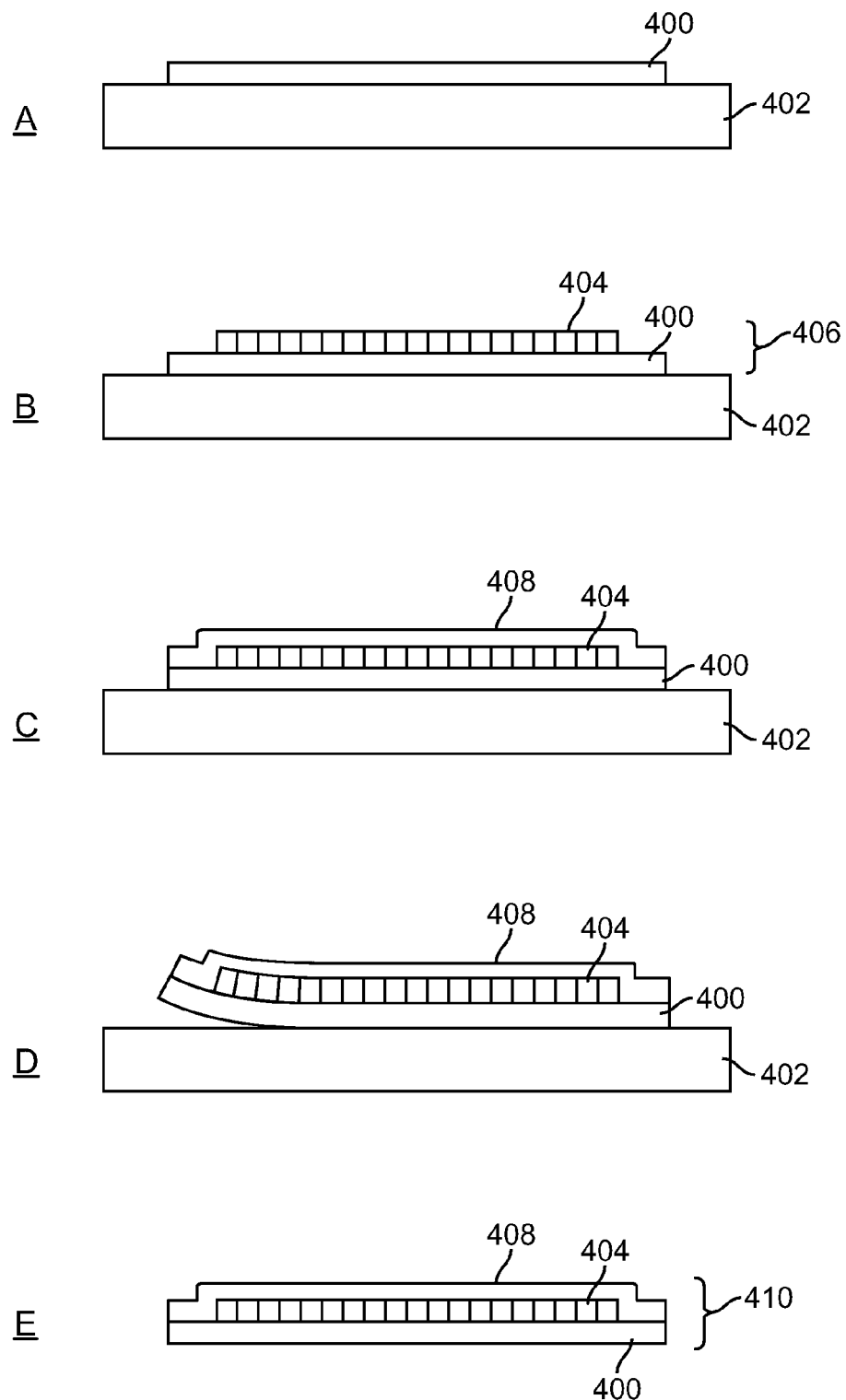
FIGS. 8A through 8E illustrate production of a flexible radiation detector according to an embodiment of the invention.

Production of a flexible scintillator according to another embodiment of the invention is described with respect to FIGS. 8A through 8E. Production is similar to above, but with added additional layer(s) covering the scintillator layer. A layer of organic polymer resin 400 is deposited on a substrate 402 having a low coefficient of friction such that the resin 400 can be practically removed following deposition on the substrate 402 (FIG. 8A). Once the resin coating 400 is deposited to cover the desired shape or area of the substrate 402 surface, a layer of scintillator material is deposited on the resin coating 400 to form the scintillator layer 404, thereby forming a bi-layer 406 including the resin coating 400 and scintillator layer 404 (FIG. 8B). An additional coating or layer 408 (e.g., resin layer) is then formed on the scintillator layer 404, and can completely cover the area or surface of the scintillator layer 404 not in contact with the first resin layer 400 (FIG. 8C). The combination of the resin coating 400, scintillator layer 404, and additional layer 408 can then be removed from the substrate 402 surface to produce the flexible scintillator detector 410 (FIGS. 8D and 8E).

Flexible scintillator detectors can be incorporated into the assemblies of the invention (e.g., optically coupled to photodetectors, etc.) and, in some instances, laid on an area of flat panels (e.g., amorphous silicon containing panels) without having to use the panel as the actual substrate for scintillator deposition. For example, once a flexible scintillator is laid on a flat panel the flexible scintillator can be coupled (e.g., using an optically transparent adhesive) to a readout sensor, e.g. a photodetector. Such an approach can reduce risks associated with the typical direct deposition on flat panels as well as reduce associated production costs. For example, typically, when the photodetector is used as a substrate according to other known methods (as opposed to the flexible scintillator detector production methods described herein), it needs to be firmly held in a frame and exposed to the deposition temperatures. This can stress the photodetector and damage it. In addition, the first coating, whether it is a resin or the scintillator material itself, adheres to exposed surfaces in the photodetector, including its delicate electrical contacts. When excess or unwanted material is removed, these electrical contacs can be damaged, resulting in a rejected device. In contrast, flexible scintillators can be coupled to various designs of panels, including flexible amorphous silicon panels being developed for digital radiography, thereby reducing handling stresses on these delicate and expensive panels. See, e.g., U.S. Pat. No. 5,117,114.

In another embodiment, a flexible scintillator can be mounted in a frame or support structure and optically viewed from one or both sides, or the flexible scintillator can be "sandwiched" between sensors, fiber optic couplers, photodetector flat panels, and the like. As set forth above, when viewed from both sides, scintillation based detectors, including flexible scintillators, can provide an improved combination of spatial resolution and light yield.

Among the various applications in which flexible scintillators can be used is included non-destructive testing and single photon emission computed tomography (SPECT) with pinhole collimators, and cone-beam X-ray computed tomography, all applications where parallax errors due to the penetration of high energy radiation (e.g., X-rays, gamma rays, etc.) in the scintillator film is high. The curved shape of the positioned flexible scintillator in these cases can reduce the parallax errors and improve the spatial resolution. This can be the case where the source volume is fairly localized and it is possible to "focus" the microcolumns on the source volume. Non-limiting examples include small animal imaging and neutron diffraction as well as X-ray imaging, where the source location is known.

When positioned on a surface or object (e.g., panel, photodetector, etc.), a flexible radiation detector may at least partially conform to the contour or shape of the object. For example, in some radiation detection contexts, particularly in neutron diffraction, cylindrical detectors may be preferred. A flexible scintillator with a suitable layer of neutron converter (e.g., gadolinium (Gd), boron (B), etc.) can be used in such situations due, for example, to the ability of the flexible scintillator to at least partially conform to the desired contour of the detector.

A variety of different scintillators may be used in forming a scintillator layer on a radiation detector of the present invention. Scintillators can include, for example, CsI(Tl), NaI(Tl), CsI(Na), CsI(Eu), CsBr(Eu), CsI(Tl:Eu), ZnS, ZnS (Ag), ZnSe(Te), LaBr$_3$(Ce), LaCl$_3$(Ce), LaF$_3$, LaF$_3$(Ce), ceramic scintillators, and the like. In a particular embodiment of the present invention, the radiation detector includes a scintillator layer having a CsI(Tl) scintillator, such as a microcolumnar CsI(Tl) scintillator (Nagarkar et al., *IEEE Trans. Nucl. Sci.* 44:492 (1998); Nagarkar et al., IEEE Trans. Nucl. Sci. 44:885 (1997)). Furthermore, a microcolumnar layer may be pixellated, for example, so as to further improve spatial resolution. Thus, in one embodiment, the scintillator layer includes a pixellated micro-columnar film scintillator. For further discussion of pixellated microcolumnar film scintillators see, for example, Nagarkar et al., *SPIE, Physics of Medical Imaging*, Vol. 4, No. 21, pp 541-546, (2003); and Shestakova et al., *IEEE Trans. Nucl. Sci., Vol. 52, No. 4., Aug. (2005)*. See also, commonly owned U.S. Pat. No. 6,921,909, which is incorporated herein by reference.

The high density and high average atomic number of CsI(Tl) converts incident radiation into light with high efficiency and the microcolumnar structure channels the scintillation light by total internal reflection to the detection device (e.g., CCD). The conversion gain of CsI(Tl) is ~60,000 photons/MeV. Furthermore, the scintillator structure can be made sufficiently thick (e.g., 3 mm to 4 mm) to absorb a significant fraction, e.g., about 70% or more, of incident high energy gamma radiation without sacrificing the spatial resolution, overcoming the traditional tradeoff between these quantities. Thus, a combination of the high stopping power (e.g., 70% or higher) and high light output (e.g., 60,000 photons/MeV), along with the excellent light channeling properties of microcolumnar CsI(Tl) (evident from its spatial resolution measurements) allow detection of energetic photons (e.g., X-rays, gamma-rays, etc.) with high efficiency, high signal-to-noise ratio (SNR), and high spatial resolution.

The combination of a microcolumnar CsI(Tl) scintillator and an optically coupled detector can provide very high sensitivity, for example with a range of about 90% to about 95%, high spatial resolution, such as for example, from about 50 to about 70 μm, and a substantially improved signal to noise ratio ("SNR") (e.g., an improvement of about a 10 times) and high spatial resolution.

Scintillators used in the inventive radiation detectors may be suitable for use in high-speed imaging applications. In high-speed imaging applications, for example, a premium is placed on the X-ray to light conversion efficiency, the speed of emission or decay time, and the X-ray stopping power of the scintillator. CsI(Tl) has high light conversion efficiency, a fast decay time, good X-ray stopping properties, and is easily fabricated.

The thickness of the scintillator layer will depend, in part, on the desired use of the radiation detector. For example, the scintillator layer will have a thickness of about 10 μm to about 5 mm. In one embodiment, a microcolumnar CsI(Tl) scintillator will have a thickness of about 3 mm to about 5 mm (e.g., "thick" scintillator). In other embodiments, the scintillator is a "thin" scintillator, having a thickness of about 10 μm to about 0.5 mm. As can be appreciated, the terms "thick" and "thin" are relative terms, and the thickness of a "thick" CsI(Tl) scintillator layer will merely be thicker than the desired spatial resolution. Because the columnar structure of the CsI(Tl) scintillator layer, the columns channel light mostly along the columns, so that the resolution is determined by column diameter, instead of the thickness of the layer, and the thickness can therefore be higher without detrimentally affecting the resolution, except for parallax effects.

In one embodiment, for example, a radiation detector of the invention may be used for X-ray detection, where incident X-rays have energies ranging from about 30 kVp to about 65 kVp, and scintillator films of various thickness in the range of 100 μm to 2 mm are deposited to ensure >90% absorption of X-rays. For $^{125}$I with about 27.2 to 31 keV emission energies, films of 250 μm thickness (approximately 70% absorption) and/or 500 μm (approximately 93% absorption) with microcolumnar diameters in the range of 5 to 10 μm can be used. (Nagarkar et al., *IEEE Trans. Nucl. Sci.* 44:492 (1998); Nagarkar et al., IEEE Trans. Nucl. Sci. 44:885 (1997)). On the other hand, for 140 keV $^{99m}$Tc gamma rays 3 mm to 4 mm thick films (approximately 70% absorption) with column diameters in the range of 30 to 40 μm can be used. This increased column diameter ensures excellent light channeling in very thick structures. Planetary systems which holds the substrates in the vapor deposition chamber may be used to obtain better than 0.3% CsI(Tl) film thickness non-uniformity.

Scintillator materials forming a scintillator layer of the present invention typically include a "dopant" that can effect certain properties, such as physical properties (e.g., brittleness, and the like) as well as scintillation properties (e.g., luminescence, light yield, resolution, and the like), of the scintillator materials. For example, in embodiments where the scintillator layer include a CsI(Tl) film (e.g., vapor deposited film), thallium concentration can be an important parameter to control, for example, in order to ensure suitable deposition of the scintillator material. Control of dopant concentration in vapor deposited films can be accomplished by co-evaporating the dopant with the scintillator material. For example, thallium can be co-evaporated with CsI. For high light yield in CsI(Tl) films, a higher dopant (Tl) concentration (e.g., about 0.5 to about 0.7% by molar weight) can be used. For high resolution, a moderate dopant (Tl) concentration can be incorporated in the scintillator layer (e.g., about 0.2 to about 0.3% by molar weight). Resulting films can be annealed, for example, to ensure response uniformity over the scintillator layer. Additional techniques for depositing scintillator compositions can include, for example, flash evaporation techniques, including where properly doped material is dropped into a hot boat and instantly evaporated and, therefore, the composition of the scintillator film remains the same as the source. Scintillator compositions can also be deposited by pulse laser evaporation in order to form the scintillator layer.

The radiation detector can additionally have one or more coatings or layers including, for example, a coating or layer formed on a surface of the scintillator layer not in contact with the optically transparent substrate. In one embodiment, an additional coating is formed on a surface of the scintillator layer not in contact with or opposite the optically transparent substrate, which can provide a complete cover of the scintillator. The additional layer or coating can include, for example, an optically transparent polymer protective layer, a moisture protective barrier, and the like. In one embodiment, a layer or coating of resin, such as an organic polymer resin (see above), is formed on a surface of the scintillator layer not in contact with the optically transparent substrate, so that the scintillator layer is essentially encapsulated by the optically transparent substrate and the resin coating. Where the optically transparent substrate is a resin and the detector further includes an additional resin coating, the resin substrate and additional resin coating can include the same organic polymer resin (e.g., para-xylylene polymer) or different resins.

As set forth above, the radiation detection assembly of the invention additionally includes optically coupled imaging photodetectors. Various photodetectors and configurations thereof are available according to the present invention and will depend, in part, on the type of detection assembly and/or the intended use of the assembly. One advantage of the present invention, however, is that the radiation detector can be optically coupled with one or more position-sensitive photodetectors. A position-sensitive photodetector is a detector that is capable of determining the position on the photodetector at which an interaction with an incident light photon occurs. The determination can be made in either one dimension or two dimensions. Accordingly, position-sensitive imaging photodetectors used in the invention assemblies and methods can include a photodetector where the read-out is in one dimension ("one-dimensional" photodetector) or a photodetector where the read-out is in more than one dimension, including two dimensions ("two-dimensional" photodetectors), or combinations thereof.

A two-dimensional photodetector is a device capable of spatially resolving or localizing where in a plane (e.g., detection area) a light photon has interacted with the photodetector. Thus, two-dimensional detectors are configured such that the detection area extends in two dimensions, and the two-dimensional photodetector typically provides an x, y coordinates for the interaction point. A photon that impinges on the detector area is registered as an event and its two spatial coordinates are registered. In one embodiment, the two-dimensional photodetector can include an array or "grid" of discrete detection elements. For example, for area imaging the readout device of the detector is two-dimensional, with M×N elements, where M and N are the number of resolved elements along each dimension. In another embodiment, the detection area of the two-dimensional detector can be a continuous area. A one-dimensional detector is configured such that the detection area is generally linear and extends in one dimension. For example, a one-dimensional photodetector is similar to a single row two-dimensional photodetector. If a photon impinges on the detection area, the one-dimensional detector detects this occurrence and provides a coordinate in one dimension for the interaction point. For further discussion of position-sensitive photodetectors, including one-dimensional and two-dimensional photodetectors, see, for example, commonly owned U.S. Pat. No. 6,998,619, which is incorporated herein by reference. Non-limiting examples of 1-D detectors include linear photodiode arrays (e.g. Texas Advanced Optoelectronic Solutions, Inc. TSL3301 High-sensitivity linear photodiode array with 300 dpi pixel density) and linear CCD arrays (e.g. Fairchild Imaging CCD191, 6,000×1 pixel array). Non-limiting examples of commonly used 2-D detectors include photodiode arrays (e.g. Hamamatsu S2721-02), CCDs (e.g. TH 8730 1024× 1024 pixel CCD, Thales Corporation), CMOS arrays (e.g. Micron Technologies MT9D131 1600×1200 CMOS imaging sensor), a-Si:H Flat panel detectors (e.g. PerkinElmer XRD 1640 AN4), Avalanche Photodiode Arrays (APDs) (e.g. RMD A6403 8×8 pixellated APD), Position Sensitive Si Detectors (e.g. S5378-02 or S5378-03 PSDs), Position Sensitive photomultipliers (PSPMTs) (e.g. Hamamatsu H-8500 Flat Panel MAPMT), multi-anode photomultipliers (MAPMTs) (e.g. Hamamatsu H7546B-20 and H8711-20), MCP-PMTs (e.g. Burle 85011 MCP-PMT, Burle Corporation Data Sheet.).

Figure 2:
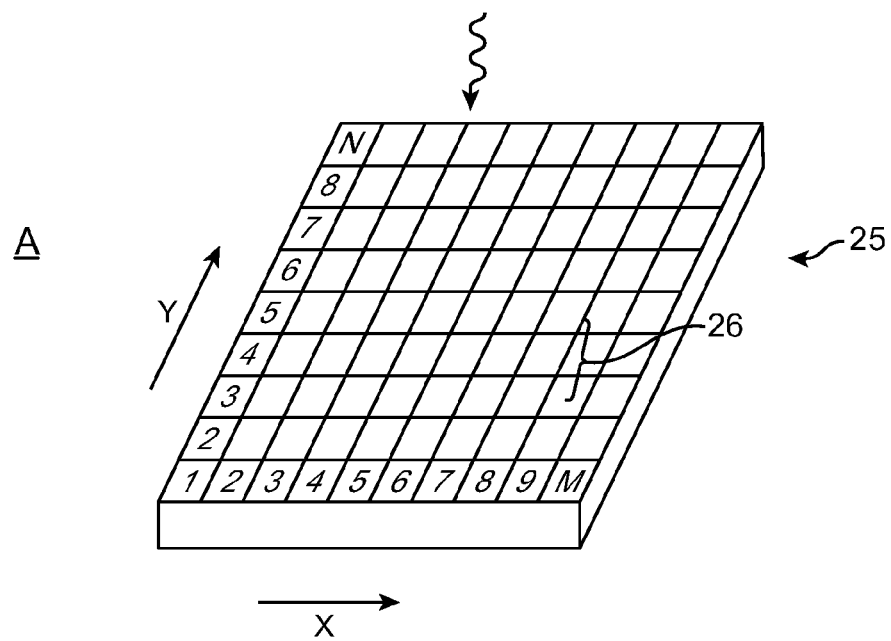
FIGS. 2A through 2C illustrate imaging photodetectors.
Figure 2:
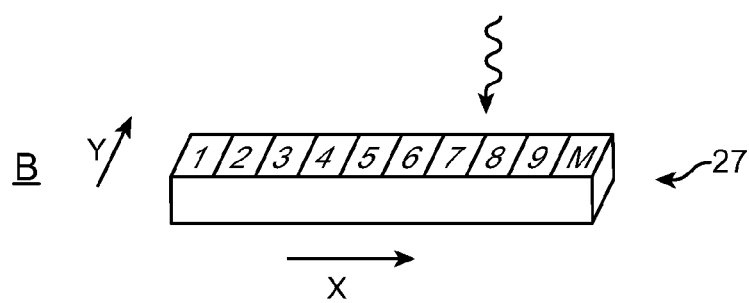
Figure 2:
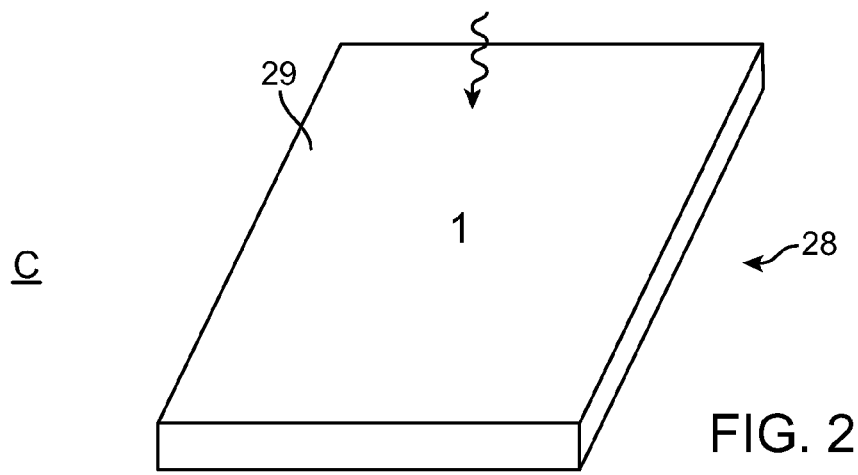

FIGS. 2A through 2C show a schematics of the conceptual operation of the photodetectors that can be coupled with a radiation detector according to the present invention. In one embodiment, a radiation detection assembly can include a two-dimensional photodetector 25 (FIG. 2A). A two-dimensional photodetector 25 includes a detection plane or area 26 which includes a plurality of detection elements (e.g., M×N). The two-dimensional photodetector device 25 can localize where on the detection plane 26 a light photon (e.g., photon emitted from a coupled scintillator) has interacted with the photodetector 25. The photodetector 25 provides spatial resolution of the photon detection by providing an x, y coordinate for the interaction point. A one-dimensional photodetector 27 is illustrated in FIG. 2B and includes a plurality of detection elements that extend in one dimension (e.g., M elements), similar to a single row of detection elements in a two-dimensional detector. The photodetector 27 can localize in one dimension on the detection plane where a light photon has interacted with the photodetector 27.

A single element photodetector 28 is shown in FIG. 2C. A single element photodetector 28 detects a light photon incident to a single detection area 29, but can not spatially resolve where on the detection area 29 the photon has interacted. Thus, in contrast to the position-sensitive two-dimensional (FIG. 2A) and one-dimensional (FIG. 2B) photodetectors, a single element photodetector (FIG. 2C) is not position sensitive.

The radiation detection assembly of the invention can include additional optics for receiving and transmitting light from the detector to optically coupled photodetectors. Light receiving and transmitting optics can include, for example fiber optic elements, lenses, mirrors (e.g., low-density mirrors, etc.), and the like. In some instances, for example, light receiving and transmitting optics can be used to position the coupled photodetectors out of a path of energetic photons incident to the radiation detector as to avoid direct illumination of the photodetectors by the energetic photons (e.g., X-ray beam).

In one embodiment, the assembly includes multiple two-dimensional photodetectors, where a two-dimensional imaging photodetector is optically coupled each of the first and second sides of the radiation detector. The duplicated information provided in such a configuration allows for improved spatial, energy and time resolution (e.g., approximately 30% improvement), compared to detection utilizing only one side of a detector.

In another embodiment, the first and second photodetectors are one-dimensional photodetectors. Each side of the radiation detector can be optically coupled to a photodetector, for example, by light transmitting and receiving optics, such as fiber optic, lens (e.g., cylindrical lens), and/or mirror components. Each one-dimensional photodetector will have M or N elements, so that M and N elements in two one-dimensional photodetectors can read M×N spatial positions. The photodetectors can be oriented along orthogonal axes or non-orthogonal axes. A non-orthogonal orientation, for example, will improve spatial resolution along one dimension compared to the other.

The assembly can alternatively include a combination of one-dimensional and two-dimensional detectors. For example, in one embodiment, the first photodetector is a two-dimensional photodetector and the second photodetector comprises a single element illuminated by the scintillator layer of the radiation detector.

Figure 3:
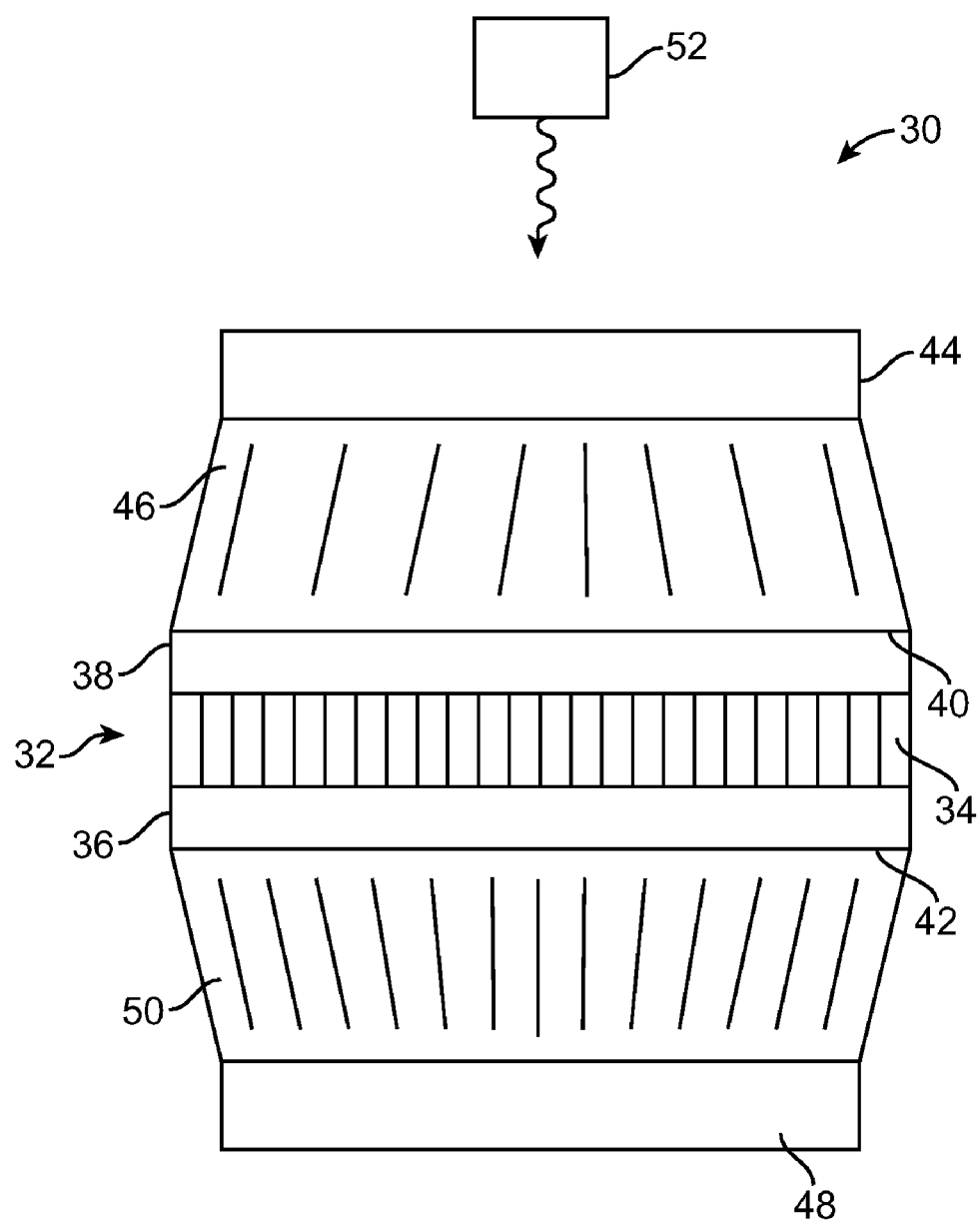
FIG. 3 shows a radiation detection assembly employing a fiber optic coupler, according to another embodiment of the present invention.

In a particular embodiment of the present invention, a radiation detector can be coupled to photodetectors using light receiving and transmitting optics, such as a fiber optic coupler, as shown in FIG. 3. As illustrated, the radiation detection assembly 30 includes a detector 32 including a scintillator layer 34 deposited on a substrate 36. The detector 32 can optionally include additional layer(s), such as a layer 38 formed on the scintillator layer 34 (see above). In one embodiment, the layer 38 includes an organic resin layer formed on the scintillator layer 34. The detector includes a first side 40 and a second side 42. The first side 40 of the detector 32 is optically coupled to a photodetector 44 using a fiber optic coupler 46. Similarly, the second side 42 is optically coupled to a photodetector 48 using a fiber optic coupler 50. Fiber optic faceplates with 6 μm fibers and interstitial extramural absorption fibers (EMA) can be obtained from sources such as Incom, Inc., Southbridge, Mass.

In operation, radiation or energetic photons emitted from a source 52 (e.g., target) incident to the detector 32 are stopped by the scintillator layer 34 and light produced by the scintillator layer 34 as a result is directed to the photodetectors 44, 48 via fiber optic couplers 46, 50, respectively.

Figure 4:
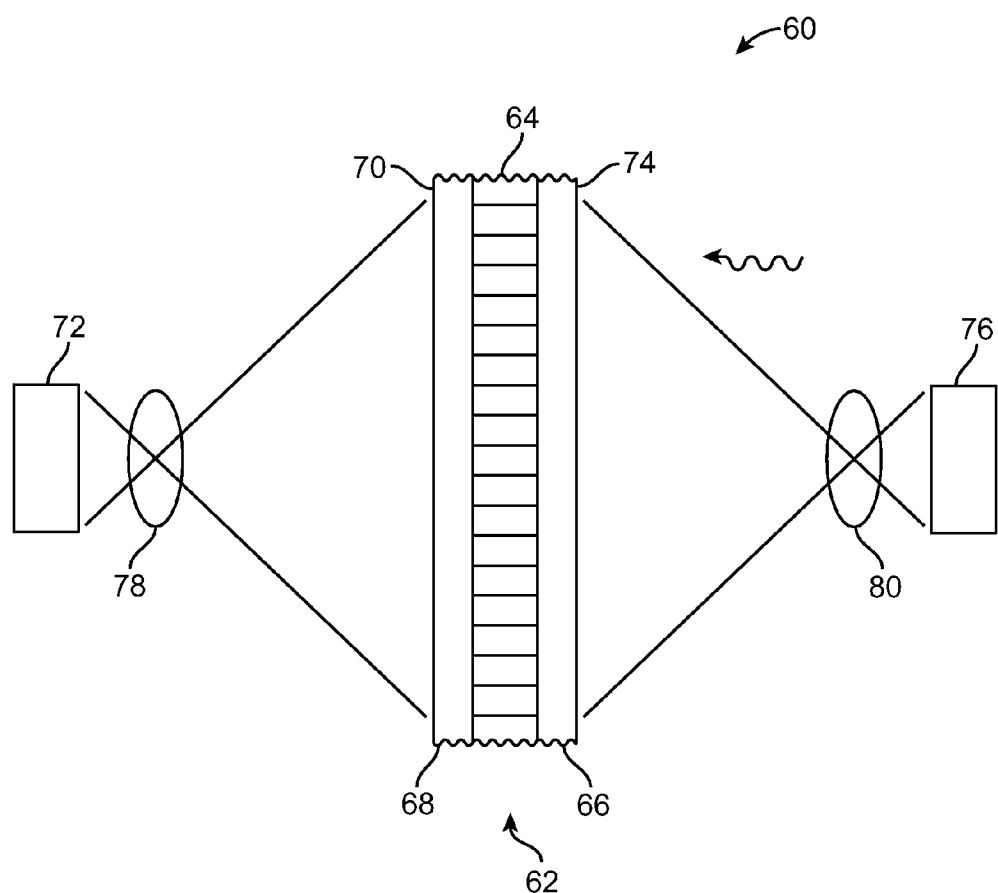
FIG. 4 illustrates a radiation detection assembly including optical components, according to an embodiment of the present invention.

A detection assembly can include one or more light receiving and transmitting optics, including lenses, for optically coupling a radiation detector and photodetectors, such as by transmitting light emitted from the scintillator to the photodetectors, as illustrated in FIG. 4. The detection assembly 60 includes a radiation detector 62 including a scintillator layer 64 deposited on a substrate 66. The radiation detector 62 can optionally include one or more additional layers, such as a layer 68 formed on the scintillator layer 64 (see above). The radiation detector 62 includes a first side 70 optically coupled to a photodetector 72, and a second side 74 generally opposite the first side 70, the second side 74 being optically coupled to a photodetector 76. The assembly 60 further includes transmitting optics, such as lenses 78, 80, designed and positioned so as to accept light emitted from the scintillator layer 64. The light emitted from the scintillator layer 64 of the detector can then be directed by the lenses 78, 80 to a location elsewhere in the assembly as to allow detection. As depicted in FIG. 4, lenses 78, 80 can direct light to suitably placed photodetectors 72, 76, respectively.

Thus, in operation of the radiation detection assembly 60, light photons emitted by the scintillator layer 64 following stopping of incident energetic photons by the scintillator layer 64 are emitted from the radiation detector 62 from at least the first side 70 and the second side 74. Light emitted from the first side 70 is collected by the lens 78 and transmitted to the photodetector 72. Similarly, light emitted from the second side 74 is collected by the lens 80 and transmitted to the photodetector 76.

Figure 5:
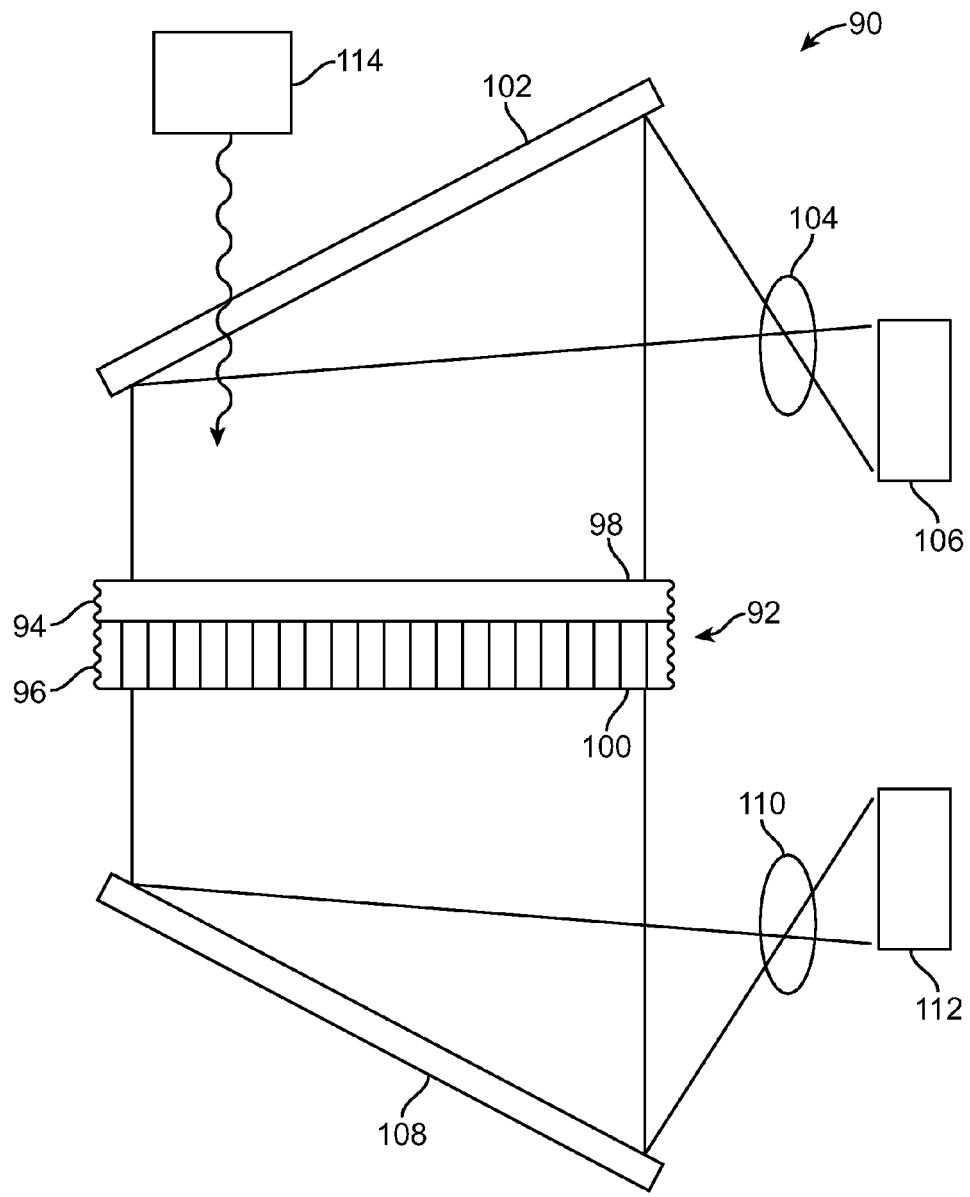
FIG. 5 shows a radiation detection assembly having optical lens and mirror combinations according to the present invention.

In another embodiment, a radiation detection assembly of the present invention can include light transmitting and receiving optics including a combination of lenses and mirrors for directing light emitted from scintillator layer of a radiation detector to imaging photodetectors, as shown in FIG. 5. The assembly 90 includes a detector 92 having a scintillator layer 96 deposited on an optically transparent substrate 94. The detector 92 has a first side 98 and an opposing second side 100. A mirror 102 can be used to deflect light photons from the first side 98 of the detector 92. As depicted, the mirror 102 is can be used to deflect light to a lens 104, which collects the light deflected by the mirror 102 and transmits the light to a suitably placed photodetector 106. Similarly, a second mirror 108 is used to deflect light photons from the second side 100 of the detector 92 to a lens 110 that transmits the light to a photodetector 112. As can be appreciated, the mirrors 102, 108 allow the photodetectors 106, 112 to be placed in the assembly 90 off the path of the energetic photons incident to the radiation detector 92. Such an arrangement can be selected, for example, where it is desired to avoid direct interactions between incident energetic photons from a source 114 and the photodetectors 106, 112.

Figure 6:
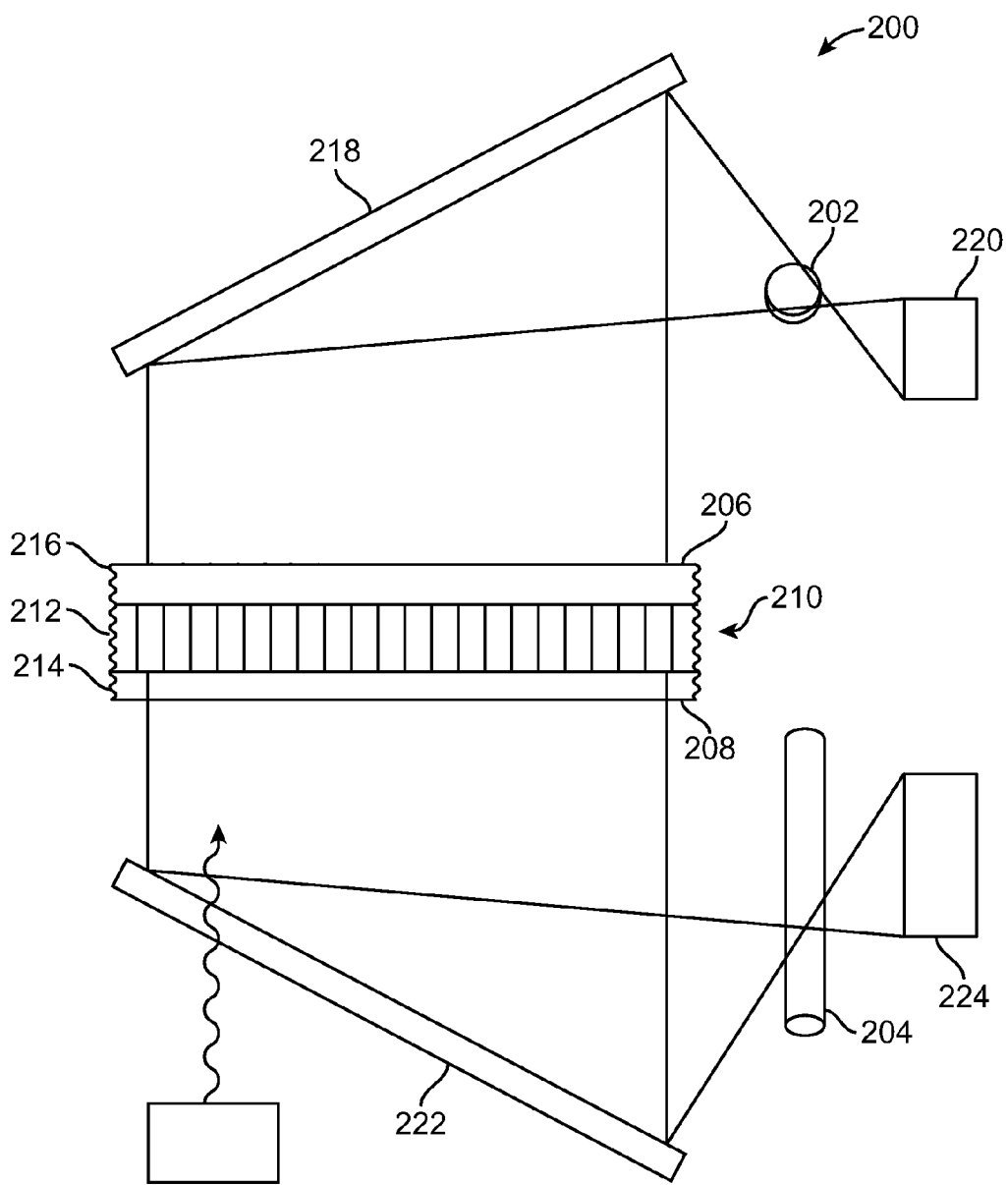
FIG. 6 illustrates a radiation detection assembly with cylindrical lens and mirror combinations, according to an embodiment of the invention.

FIG. 6 depicts an embodiment of a radiation detection assembly 200 where cylindrical lenses 202, 204 are used for one-dimensional readouts on each side 206, 208 of a radiation detector 210. The radiation detector 210 includes a scintillator layer 212 deposited on a substrate 214, and optionally includes a layer 216 formed on a surface of the scintillator layer 212 not in contact with the substrate 214. The detector 210 includes a first side 206 and a second side 206. The assembly includes a mirror 218 that directs light from the first side 206 of the detector 210 to a cylindrical lens 202. The lens 202 transmits the light to a photodetector 220. The assembly 200 additionally includes a mirror 202 that directs light from the second side 208 of the detector 210 to a cylindrical lens 204, and the lens 204 transmits light to a photodetector 224. Transmitting optics and photodetectors can be oriented along axes that are not parallel to each other, for example, so as to provide imaging in more than one dimension. As depicted in FIG. 6, the cylindrical lenses 202, 204, and the corresponding photodetectors 220, 224, are oriented along axes substantially orthogonal to each other.

The radiation detection assemblies can include incorporation of a variety of tools and devices and, as previously mentioned, the invention assemblies can be used in various methods of radiation detection. Non-limiting examples include nuclear weapons monitoring and detection, geological exploration, including well-logging, and imaging, such as imagining in nuclear medicine (e.g., single photon emission computed tomography (SPECT), X-ray computed tomography (CT), and the like).

For example, the two-sided aspect of the scintillator detectors of the invention lends the disclosed assemblies as being well suited for dual-energy measurements. By way of illustration, when using an X-ray beam with a broad distribution of energies, typical of the output of conventional X-ray tubes, different energies are differentially attenuated in the object (e.g., the 60 keV and 100 keV photons in an X-ray beam). The mass attenuation of muscle is 0.18 and 0.15 $cm^2/g$, respectively (20% difference). For calcium, the respective values are 0.66 and 0.26 $cm^2/g$ (154% difference), and for iodine, used in contrast agents, the difference increases to 290%. The net effect of this differential absorption is that the spectral distribution of the beam varies as it traverses different tissues, increasing its mean energy.

In use of an X-ray detector device, an X-ray beam's high energy components penetrate farther than the lower ones, the mean penetration length being 0.27 mm at 60 keV and 1.09 mm at 100 keV in CsI(Tl). Therefore, an image obtained from the side of the detector facing the X-ray beam will be reflective of the lower energy components in the beam, and be weighted towards representing the calcium and iodine in the subject, while the image obtained from the opposite side comes closer to representing the water-containing tissues. Processing methods are known in the art for tissue characterization using dual energy measurements, which are obtaining by switching X-ray beam generator energy or differentially filtering the beam as it exits the X-ray tube (see, e.g., Steenbeek et al., "Selection of fat-equivalent materials in post processing dual-energy quantitative CT" *Med Phys*. 1992 July-August; 19(4): 1051-6; Kelcz et al., "Conventional chest radiography vs. dual-energy computed radiography in the detection and characterization of pulmonary nodules" *AJR Am J Roentgenol*. 1994 February; 162 (2):271-8; Marshall et al., "Initial results with pre-reconstruction dual-energy computed tomography (PREDECT)" *Radiology* 1981 August; 140(2):421-30; Weaver et al., "Attenuation coefficients of body tissues using principal-components analysis" *Med Phys*. 1985 January-February; 12(1):40-5). The calculational algorithms used to extract the desired information can be applied to the case of differential imaging rather than differential beam generation. A module or system to process information (e.g., dual energy information) from the photodetectors can also be included in an invention assembly and can include, for example, a wide variety of proprietary or commercially available computers or systems having one or more processing structures, a personal computer, mainframe, or the like, with such systems often comprising data processing hardware and/or software configured to implement any one (or combination of) the method steps described herein. Any software will typically comprise machine readable code of programming instructions embodied in a tangible media such as a memory, a digital or optical recording media, optical, electrical, or wireless telemetry signals, or the like, and one or more of these structures may also be used to transmit data and information between components of the system in any of a wide variety of distributed or centralized signal processing architectures.

It is understood that the examples and embodiments described herein are for illustrative purposes only and that various modifications or changes in light thereof will be suggested to persons skilled in the art and are to be included within the spirit and purview of this application and scope of the appended claims. Numerous different combinations are possible, and such combinations are considered to be part of the present invention.

What is claimed is:

1. A flexible radiation detector, comprising a first resin layer and a microcolumnar scintillator layer deposited on the first resin layer to form a flexible layer of microcolumnar scintillator deposited on a continuous first resin layer.

2. The flexible radiation detector of claim 1, wherein the resin layer comprises an organic polymer resin.

3. The flexible radiation detector of claim 2, wherein the organic polymer resin comprises a para-xylylene polymer.

4. The flexible radiation detector of claim 1, further comprising a second resin layer formed at least on a surface of the microcolumnar scintillator layer not in contact with the first resin layer.

5. The flexible radiation detector of claim 1, wherein the microcolumnar scintillator layer is about 1 to about 500 microns in thickness.

6. The flexible radiation detector of claim 1, wherein the microcolumnar scintillator layer is greater than about 100 microns in thickness.

7. The flexible radiation detector of claim 1, wherein the microcolumnar scintillator layer comprises microcolumnar CsI(Tl).

8. The flexible radiation detector of claim 1, wherein the microcolumnar scintillator layer comprises a neutron converter.

9. A method of making a flexible radiation detector, comprising forming a first resin layer on a substrate, depositing a microcolumnar scintillator layer on the first resin layer to form a flexible layer having microcolumnar scintillator deposited on a continuous first resin layer, and removing from the substrate at least a portion of the layer combination comprising the first resin layer and the microcolumnar scintillator, thereby producing a flexible radiation detector comprising the removed portion of the flexible layer.

10. The method of claim 9, wherein the substrate comprises a material having a low coefficient of friction.

11. The method of claim 10, wherein the material comprises a polytetrafluoroethylene polymer.

12. The method of claim 9, wherein the resin layer comprises an organic polymer resin.

13. The method of claim 12, wherein the organic polymer resin comprises a para-xylylene polymer.

14. The method of claim 9, wherein the microcolumnar scintillator layer comprises microcolumnar CsI(Tl).

15. The method of claim 9, wherein the microcolumnar scintillator layer comprises a neutron converter.

16. The method of claim 9, further comprising forming a second layer on a surface of the microcolumnar scintillator layer not in contact with the first resin coating either before or after removing layer from the substrate.

17. The method of claim 9, further comprising positioning the flexible radiation detector on an amorphous silicon panel.

18. The method of claim 9, further comprising optically coupling the flexible detector with an imaging photodetector.

19. A method of making a flexible radiation detector, comprising forming a first resin layer on a substrate, depositing a microcolumnar scintillator layer on the first resin layer, forming a second resin layer on a surface of the microcolumnar scintillator layer not in contact with the first resin layer, and removing from the substrate at least a portion of a combination comprising the first resin layer, second resin layer, and the microcolumnar scintillator, thereby producing a flexible radiation detector comprising the removed portion of first resin layer, second resin layer, and microcolumnar scintillator layer.

20. The method of claim 19, wherein at least one of the first and second resin layers comprise an organic polymer resin.

21. The method of claim 20, wherein the organic polymer resin comprises a para-xylylene polymer.

22. A method of making a flexible radiation detector, comprising forming a first resin layer on a substrate, depositing a microcolumnar scintillator layer on the first resin layer, removing from the substrate at least a portion of a combination comprising the first resin layer and the microcolumnar scintillator, thereby producing a flexible radiation detector comprising the removed portion of first resin layer and microcolumnar scintillator layer, and coupling said flexible radiation detector to a photodetector using an optically transparent adhesive.

23. A method of making a flexible radiation detector, comprising forming a first resin layer on a substrate, depositing a microcolumnar scintillator layer on the first resin layer, forming a second resin layer on a surface of the microcolumnar scintillator layer not in contact with the first resin layer, removing from the substrate at least a portion of a combination comprising the first resin layer, second resin layer, and the microcolumnar scintillator, thereby producing a flexible radiation detector comprising the removed portion of first resin layer, second resin layer, and microcolumnar scintillator layer, and coupling said flexible radiation detector to a photodetector using an optically transparent adhesive.

24. A radiation detector assembly comprising a flexible radiation detector comprising a first resin layer and a microcolumnar scintillator layer deposited on the first resin layer to form a layer of microcolumnar scintillator deposited a continuous first resin layer, and a photodetector, whereby such flexible radiation detector and said photodetector are coupled by an optically transparent adhesive.

25. A radiation detector assembly comprising a flexible radiation detector comprising a continuous first resin layer, a microcolumnar scintillator layer deposited on the continuous first resin layer and a second resin layer deposited on surfaces of the scintillator layer not in contact with the continuous first resin layer; and a photodetector coupled directly to the flexible radiation detector by an optically transparent adhesive.

* * * * *